United States Patent [19]

Ganster et al.

[11] 4,303,773
[45] Dec. 1, 1981

[54] PROCESS FOR THE PRODUCTION OF POLYURETHANE UREA ELASTOMERS

[75] Inventors: Otto Ganster; Hans J. Meiners, both of Leverkusen; Willi Eifler, Bergisch Gladbach; Holger Meyborg, Odenthal; Jürgen Schwindt, Leverkusen, all of Fed. Rep. of Germany

[73] Assignee: Bayer Aktiengesellschaft, Bayerwerk, Fed. Rep. of Germany

[21] Appl. No.: 148,109

[22] Filed: May 9, 1980

[30] Foreign Application Priority Data

May 21, 1979 [DE] Fed. Rep. of Germany ....... 2920501

[51] Int. Cl.$^3$ ............... C08G 18/32; C08G 18/24; C08G 18/16
[52] U.S. Cl. .................................. 528/64; 528/906; 528/58; 528/52; 528/51; 528/48; 528/49; 260/37 N
[58] Field of Search ............................... 528/64

[56] References Cited

U.S. PATENT DOCUMENTS

| | | | |
|---|---|---|---|
| 3,036,996 | 5/1962 | Kogon | 528/66 |
| 3,188,302 | 6/1965 | Lorenz | 528/63 |
| 3,194,793 | 7/1965 | Kogon | 260/18 TN |
| 3,412,071 | 11/1968 | Sundholm | 528/64 |
| 3,563,906 | 2/1971 | Hoeschell | 528/83 |
| 3,702,362 | 11/1972 | Shen et al. | 424/322 |
| 3,725,354 | 4/1973 | Sundholm | 528/64 |
| 4,208,507 | 6/1980 | Stutz et al. | 528/64 |
| 4,248,756 | 2/1981 | Koenig et al. | 528/64 |

FOREIGN PATENT DOCUMENTS

| | | |
|---|---|---|
| 2231529 | 1/1974 | Fed. Rep. of Germany . |
| 1281180 | 7/1972 | United Kingdom . |
| 1408943 | 10/1975 | United Kingdom . |
| 1412818 | 11/1975 | United Kingdom . |

Primary Examiner—H. S. Cockeram
Attorney, Agent, or Firm—Gene Harsh; Joseph C. Gil; Lyndanne M. Whalen

[57] ABSTRACT

This invention relates to a process for the production of non-cellular polyurethane ureas elastomers using a chain-extender mixture produced from asymmetrically alkyl-substituted anilines by condensation with formaldehyde. The chain-extending agents used in the instant invention show medium reactivity to compounds containing isocyanate groups. These chain-extending agents may be processed both in high-pressure and in low-pressure metering and mixing units because they are either liquid at room temperature or can be melted at relatively low temperatures (below 55° C.). The homogeneous, i.e. non-cellular, polyurethane urea elastomers obtained in the instant invention are distinguished by having excellent mechanical properties.

12 Claims, No Drawings

PROCESS FOR THE PRODUCTION OF POLYURETHANE UREA ELASTOMERS

FIELD OF THE INVENTION

This invention relates to a process for the production of non-cellular polyurethane urea elastomers using a chain-extender mixture produced from asymmetrically alkyl-substituted anilines by condensation with formaldehyde. The chain-extending agents used in the instant invention show medium reactivity to compounds containing isocyanate groups. These chain-extending agents may be processed both in high-pressure and in low-pressure metering and mixing units because they are either liquid at room temperature or can be melted at relatively low temperatures (below 55° C.). The homogeneous, i.e. non-cellular, polyurethane urea elastomers obtained in the instant invention are distinguished by having excellent mechanical properties.

BACKGROUND OF THE INVENTION 4,4'-diaminodiphenyl methanes symmetrically substituted on the nucleus are known from a number of publications as chain-extending agents for use in the production of polyurethane urea elastomers. German Offenlegungsschrift No. 1,949,165 and U.S. Pat. No. 3,188,302 for example, describe chain-extending agents corresponding to the general formula:

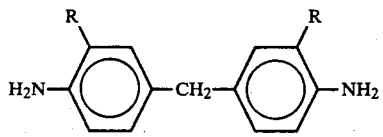

where R=H, —$CH_3$, —$OCH_3$, —$COOCH_3$, —Cl. German Offenlegungsschrift No. 2,731,815 describes, for example, a chain-extending agent corresponding to the following formula:

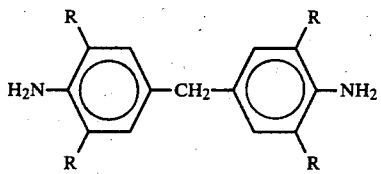

where R=$CH_3$. These substituted aromatic diamines, however, are extremely difficult to process because of their high melting points.

The above-mentioned chain-extending agents may be divided into two groups in respect to their reactivity to isocyanates. The unsubstituted and alkyl-substituted diaminodiphenyl methanes react very quickly. Examples of these are 4,4'-diaminodiphenyl methane (melting point: 93° C.), 3,3'-dimethyl-4,4'-diaminodiphenyl methane (melting point 156° C.) and 3,3', 5,5'-tetramethyl-4,4'-diaminodiphenyl methane (melting point: 124° C.). These high-melting chain-extending agents can only be processed in highly heated processing machines. These processes affect the operating personnel because of the heat given off and the vapors emanating from the amines (which are unavoidable even under clean working conditions). Because of their high reactivity, the above-mentioned diamines can only be machine-processed which, owing to the high melting point, also gives rise to machinery problems (for example crystallization of the diamines in pipes).

The relatively slow-reacting diamines are the second group of chain-extending agents. 3,3'-dichloro-4,4'-diaminodiphenyl methane (MOCA), which has a melting point of from 99° to 107° C., and 3,3'-dicarbomethoxy-4,4'-diaminodiphenyl methane which has a melting point of 146° C. are examples of these. Although these products show such low reactivity as chain-extenders that they can be processed without using machines, their high melting points again cause problems. Because of their low reactivity, the cycle times in the production of moldings are also relatively long.

Diaminodiphenyl methane symmetrically substituted in the 3- and 3'-positions are also known as chain-extenders from U.S. Pat. Nos. 3,036,996 and 3,194,793. In addition to the already mentioned disadvantage of the high melting points of diamines such as these, the simultaneous use of other reaction components, i.e. chlorine-substituted 1,4-bis-($\beta$-hydroxyethyl-mercapto)-benzene or aromatic secondary diamines, is specified as essential in the above-mentioned patents. Combinations such as these, however, lead to products of reduced elasticity which, in addition, are characterized by a marked dependence on the temperature of the shear modulus (oscillating twisting test).

According to German Auslegeschrift No. 2,146,476, the high-melting MOCA is dissolved in a polycyclic hydrocarbon in order to avoid the high-melting temperature problems. This type of procedure, however, results in the undesirable dilution of the elastomer with relatively large quantities of a non-chemically incorporated foreign product.

The object of the present invention is to provide chain-extending agents which, in addition to high reactivity to isocyanates (short in-mold times), have a low melting point. An additional object is to produce elastomers which have excellent mechanical properties.

It has now surprisingly been found that these objects can be achieved by using as chain-extending agents mixtures of asymmetrically substituted diaminodiphenyl methanes which are formed during the condensation of alkyl-substituted aniline mixtures with formaldehyde.

DESCRIPTION OF THE INVENTION

The instant invention relates to a process for the production of non-cellular polyurethane urea elastomers comprising reacting:

(a) polyisocyanates, (b) compounds containing at least two isocyanate-reactive hydrogen atoms and having a molecular weight in the range of from 400 to 15,000, (c) alkyl-substituted diaminodiphenyl methanes as chain-extending agents, optionally (d) up to 100 mol percent and preferably less than 50 mol percent, based on (c), of compounds containing at least two reactive hydrogen atoms and having a molecular weight in the range of from 32 to 400, further optionally in the presence of (e) catalysts and other known additives; optionally in stages, which is further characterized in that component (c) is formed by a formaldehyde condensation of alkyl-substituted anilines corresponding to the formulae:

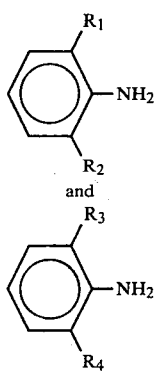

(A)

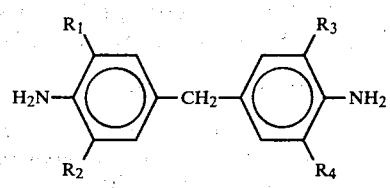

(B)

with a molar ratio of A to B of from 1:4 to 4:1, preferably from 1:3 to 3:1, with particular preference from 1:2 and 2:1 and, more particularly, around 1:1; where $R_1$ and $R_3$ which may be the same or different represent hydrogen or an optionally branched alkyl radical containing from 1 to 4 carbon atoms, preferably hydrogen, an ethyl or isopropyl radical, and, $R_2$ and $R_4$ which may be the same or different represent an alkyl radical containing from 1 to 4 carbon atoms, preferably an ethyl or isopropyl radical, further characterized in that the two anilines, A and B are different from one another.

According to the instant invention, it is preferred to use condensation products of 1. 2-ethyl aniline and 2-isopropyl aniline,
2. 2-ethyl aniline and 2,6-diethyl aniline,
3. 2-ethyl aniline and 2,6-diisopropyl aniline and
4. 2,6-diethyl aniline and 2,6-diisopropyl aniline.

It is particularly preferred to use the condensation products of 2,6-diethyl aniline and 2,6-diisopropyl aniline, and the condensation products of 2,6-diethyl aniline and 2-ethyl aniline.

The chain extender mixtures used in the instant invention are produced using a known method by subjecting the two substituted anilines A and B to acidcatalyzed condensation with formaldehyde. Suitable formulations and procedures are described, for example, in German Offenlegungsschriften Nos. 2,156,477 and 2,231,529 (British Pat. Nos. 1,408,943 and 1,412,818). Although these Offenlegungsschriften also describe the production of polyurethane plastics from the condensation products, the products obtained are not elastomers, but polyurethane foams. It must be regarded as extremely surprising that high-quality elastomers can be produced by means of the formaldehyde condensation products of the substituted anilines A and B insofar as these condensation products represent a mixture of a number of different symmetrically and asymmeyrically substituted diaminodiphenyl amines. From previous experience in polyurethane chemistry, it had been assumed that the use of a chain-extender mixture according to the instant invention would result in faults in the structure of the "rigid segments" of the polyurethane (the urea groups) and would considerably impair the mechanical properties of the elastomers in comparison with those of pure substances, particularly symmetrically substituted diaminodiphenyl methanes.

The chain-extender mixtures of the instant invention contain as the main component, a substituted diaminodiphenyl methane corresponding to the formula:

wherein $R_1$, $R_2$, $R_3$, and $R_4$ are defined as above and the two phenyl groups are substituted differently.

Depending on the molar ratio between the anilines A and B used for the condensation reaction with formaldehyde, the proportion of this compound in this chain-extender mixture amounts to at least 25 mol percent, preferably to between 40 and 65 mol percent and most preferably, to between 50 and 60 mol percent. The invention is optimized when substantially equimolar quantities of the substituted anilines A and B are condensed with formaldehyde. In addition, the chain-extender mixture naturally contains some symmetrically substituted diaminodiphenyl methanes corresponding to the formulae:

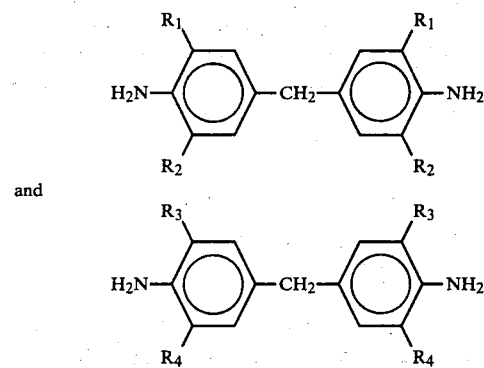

and wherein $R_1$, $R_2$, $R_3$, and $R_4$ are defined above.

In addition, other position isomers or even more highly nuclear condensation products may be present in small quantities.

It has also surprisingly been found that condensation products of an alkyl-substituted aniline (A or B) and an unsubstituted aniline as the chain-extending agent lead to polyurethane elastomers having a very moderate property level (cf. Comparison Examples 5 and 6).

The following materials are used for carrying out the process according to the present invention.

Starting components (a) include aliphatic, cycloaliphatic, araliphatic, aromatic and hetrocyclic polyisocyanates of the type described, for example, by W. Siefken in Justus Liebigs Annalen der Chemie, 562 pages 75 to 136. Polyisocyanates corresponding to the formula:

$$Q(NCO)_n$$

wherein $n=2-4$, preferably 2, and Q represents an aliphatic hydrocarbon radical containing from 2 to 18 carbon atoms, preferably from 6 to 10 carbon atoms, a cycloaliphatic hydrocarbon radical containing from 4 to 15, preferably from 5 to 10 carbon atoms, an aromatic hydrocarbon radical containing from 6 to 15, preferably from 6 to 13 carbon atoms, or an araliphatic hydrocarbon radical containing from 8 to 15, preferably from 8 to 13 carbon atoms may be used. Suitable examples are, for example, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers. Further suitable examples are 1-isocyanato-3,3,5-trimethyl-5-isocyanato-methyl cyclohexane (German Auslegeschrift No. 1,202,785, U.S. Pat. No. 3,401,190), 2,4-and 2,6-hexahydrotolylene diisocyanate and mixtures of these isomers. Hexahydro-1,3- and/or 1,4-phenylene diisocyanate, perhydro-2,4'- and/or 4,4'-diphenyl methane diisocyanate, 1,3- and 1,4-phenylene diisocyanate, 2,4- and 2,6-tolylene diisocyanate and mixtures of these isomers are additional examples of suitable compounds. Diphenyl methane-2,4'- and/or -4,4'-diisocyanate and naphthylene-1,5-diisocyanate are still further examples of suitable compounds (a).

It is also possible for example, to use triphenyl methane-4,4',4''-triisocyanate, polyphenyl polymethylene polyisocyanates of the type obtained by condensing aniline with formaldehyde, followed by phosgenation, and described, for example, in British Pat. Nos. 874,430 and 848,671. Additionally, m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodimide groups of the type described in German Pat. No. 1,092,007 (U.S. Pat. No. 3,152,162) and in German Offenlegungsschriften Nos. 2,504,400; 2,537,685 and 2,552,350 norbornane diisocyanates according to U.S. Pat. No. 3,492,330 are also suitable compounds (a). Polyisocyanates containing allophanate groups of the type described, for example, in British Pat. No. 994,890, in Belgian Pat. No. 761,626 and in Dutch Patent Application No. 71,02,524, polyisocyanates containing isocyanurate groups of the type described, for example, in U.S. Pat. No. 3,001,973; in German Pat. Nos. 1,022,789; 1,222,067 and 1,027,394 and in German Offenlegungsschriften Nos. 1,929,034 and 2,004,048 are also suitable compounds (a). Polyisocyanates containing urethane groups of the type described for example in Belgian Pat. No. 752,261 or in U.S. Pat. Nos. 3,394,164 and 3,644,457, polyisocyanates containing acylated urea groups according to German Pat. No. 1,230,778, polyisocyanates containing biuret groups of the type described, for example, in U.S. Pat. Nos. 3,124,605 and 3,201,372 and in British Pat. No. 899,050, and polyisocyanates produced by telomerization reactions of the type described for example, in U.S. Pat. No. 3,654,106 are still further examples of suitable compounds (a). Polyisocyanates containing ester groups of the type described, for example, in British Pat. Nos. 965,474 and 1,072,956, in U.S. Pat. No. 3,567,763 and in German Pat. No. 1,231,688, reaction products of the above-mentioned isocyanates with acetals according to German Pat. No. 1,072,385 and polyisocyanates containing polymeric fatty acid esters according to U.S. Pat. No. 3,455,883 may also be used as compounds (a).

It is also possible to use the isocyanate-group-containing distillation residues obtained in the commercial production of isocyanates, optionally in solution in one or more of the above-mentioned polyisocyanates. It is also possible to use any mixtures of the above-mentioned polyisocyanates.

In general, it is particularly preferred to use the commercially readily available polyisocyanates for example, 2,4- and 2,6-tolylene diisocyanate, also any mixtures of these isomers ("TDI"), polyphenyl polymethylene polyisocyanates of the type obtained by condensing aniline with formaldehyde, followed by phosgenation ("crude MDI"), diphenylmethane diisocyanate containing one or more alkyl (particularly methyl) groups on the aromatic nuclei ("alkylated MDI") and polyisocyanates containing carbodiimide groups, urethane groups, allophanate groups, isocyanurate groups, urea groups or biuret groups ("modified polyisocyanates"), particularly, modified polyisocyanates of the type derived from 2,4- and/or 2,6-tolylene diisocyanate or from 4,4'- and/or 2,4'-diphenyl methane diisocyanate. According to the instant invention, TDI is the particularly preferred polyisocyanate.

Suitable starting components (b) are compounds containing at least 2 isocyanate-reactive hydrogen atoms and having a molecular weight generally of from 400 to 15,000. In addition to compounds containing amino groups, thiol groups or carboxyl groups, compounds such as these are preferably compounds containing hydroxyl groups, particularly compounds containing from 2 to 8 hydroxyl groups, above all those having a molecular weight of from 500 to 8000, preferably from 800 to 5000. Examples of these compounds (b) are polyesters, polyethers, polythioethers, polyacetals, polycarbonates and polyester amides containing at least 2, generally from 2 to 8, preferably from 2 to 4, particularly 2 hydroxyl groups, of the type known for the production of homogeneous and cellular polyurethanes.

The polyesters containing hydroxyl groups suitable for use in the instant invention are, for example, reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydride or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or be unsaturated.

Examples of carboxylic acids such as these and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids. These carboxylic acids may be optionally in admixture with monomeric unsaturated fatty acids, such as oleic acid; terephthalic acid dimethylester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol and methyl glycoside. Also suitable are diethylene glycol, triethylene glycol, tetraethylene glycol and higher polyethylene glycols, dipropylene, glycol and higher propylene glycols, dibutyl glycol and high polybutylene glycols. The polyesters may contain terminal carboxyl groups. Polyesters of lactones, for example, ε-caprolactone, or of hydroxy carboxylic acid, for example, ω-hydroxy caproic acid, may also be used.

The polyethers containing at least 2, generally from 2 to 8 and preferably 2 or 3 hydroxyl groups suitable for use in the instant invention are also known and are obtained for example by polymerizing epoxides, such as ethylene oxide, propylene oxide, butylene oxide, tetrahydrofuran, styrene oxide or epichlorohydrin on their own, for example, in the presence of Lewis catalysts, such as $BF_3$, or by the addition of these epoxides, preferably ethylene oxide and propylene oxide. optionally in admixture or successively, with starter components containing reactive hydrogen atoms, such as water, alcohols, ammonia or amines, for example, ethylene glycol, 1,3-propylene glycol or 1,2-propylene glycol, trimethylol propane, glycerol, sorbitol, 4,4'-dihydroxy diphenyl propane, aniline, ethanolamine or ethylene diamine. Sucrose polyethers of the type described, for example, in German Auslegeschriften Nos. 1,176,358 and 1,064,938 and formitol- or formose-started polyethers (German Offenlegungsschriften Nos. 2,639,083 and 2,737,951) may also be used in the instant invention. In many cases, it is preferred to use polyethers which predominantly contain primary OH-groups (up to 90% by weight, based on all the OH-groups present in the polyether). Polybutadienes containing OH-groups are also suitable for use in the instant invention.

Among the polythioethers, reference is made in particular to the condensation products of thiodiglycol on its own and/or with other glycols, dicarboxylic acids, formaldehyde, aminocarboxylic acids or amino alcohols. Depending on the co-components, the products in question are, for example, polythio mixed ethers, polythioether esters or polythioether ester amides.

Suitable polyacetals are, for example, the compounds obtainable from glycols such as diethylene glycol, triethylene glycol, 4,4'-dioxethoxy diphenyl dimethyl methane, hexane diol and formaldehyde. Polyacetals suitable for use in the instant invetion may also be obtained by polymerizing cyclic acetals such as trioxane (German Offenlegungsschrift No. 1,694,128).

Suitable polycarbonates containing hydroxyl groups are known and can be obtained, for example, by reacting diols, such as 1,3-propane diol, 1,4-butane diol and/or 1,6-hexane diol, diethylene glycol, triethylene glycol, tetraethylene glycol or thiodiglycol, with diaryl carbonates, for example, diphenyl carbonate, or phosgene (German Auslegeschriften Nos. 1,694,080, 1,915,908 and 2,221,751; German Offenlegungsschrift No. 2,605,024).

The polyester amides and polyamides include, for example, the predominantly linear condensates obtained, for example, from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups and optionally modified natural polyols, such as castor oil or carbohydrates, for example, starch, may also be used. Addition products of alkylene oxides with phenol formaldehyde resins or even with urea formaldehyde resins may also be used in the instant invention.

Before they are used in the polyisocyanate-polyaddition process, the above-mentioned polyhydroxyl compounds may be modified in various ways. For example, according to German Offenlegungsschriften No. 2,210,839 (U.S. Pat. No. 3,849,515) and 2,544,195, a mixture of different polyhydroxyl compounds (for example, a polyether polyol and a polyester polyol) may be condensed by etherification in the presence of a strong acid to form a relatively high molecular weight polyol which is made up of different segments attached through ether bridges. It is also possible, for example, in accordance with German Offenlegungsschrift No. 2,559,372, to introduce amide groups into the polyhydroxyl compounds or, in accordance with German Offenlegungsschrift No. 2,620,487, to introduce triazine groups by reaction with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamidine or acyl urea groups (German Offenlegungsschriften Nos. 2,714,289; 2,714,292 and 2,714,293). In some cases, it is particularly advantageous to completely or partly convert the relatively high molecular weight polyhydroxyl compounds into the corresponding anthranilic acid esters by reaction with isatoic acid anhydride, as described in German Offenlegungsschriften Nos. 2,019,432 and 2,619,840 and in U.S. Pat. Nos. 3,808,250, 3,975,428 and 4,016,143. Relatively high molecular weight compounds containing terminal aromatic amino groups are obtained in this way.

According to German Offenlegungsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazine groups are described in German Offenlegungsschrift No. 1,694,152 (U.S. Pat. No. 3,625,871).

According to the instant invention, it is also possible to use polyhydroxyl compounds containing high molecular weight polyadducts and polycondensates or polymers in a finely dispersed or dissolved form. Polyhydroxyl compounds such as these are obtained, for example, by carrying out polyaddition reactions (for example, reactions between polyisocyanates and amino-functional compounds) and polycondensation reactions (for example, between formaldehyde and phenols and/or amines) in situ in the above-mentioned compounds containing hydroxyl groups. Processes such as these are described for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible, however, in accordance with U.S. Pat. No. 3,869,413 or German Offenlegungsschrift 2,550,860, to mix an aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (Germam Patent No. 1,769,795; U.S. Pat. No. 3,637,909) are also suitable for use in the instant invention. Plastics having particularly good flameproof properties are obtained by using polyether polyols modified in accordance with German Offenlegungsschriften Nos. 2,442,101; 2,644,922 and 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungschriften Nos. 2,714,291; 2,739,620 and 2,654,746) may be used advantageously in combination with mineral fillers.

Where modified polyhydroxyl compounds of the type mentioned above are used as a starting component in the polyisocyanate-polyaddition process, polyurethanes having considerably improved mechanical properties are formed in many cases.

Representatives of the above-mentioned compounds used in the instant invention are described, for example, in High Polymers, Vol. XVI, "Polyurethane, Chemistry and Technology", by Saunders-Frisch, Interscience Publishers, New York/London, Vol. 1, 1962, pages 32 to 42 and pages 44 to 54 and Vol. II, 1964, pages 5–6 and 198–199, and in Kunststoff-Handbuch, Vol. VII, Vieweg-Hochtlen, Carl Hanser-Verlag, Munich, 1966, for example on pages 45 to 71. It is of course, possible to use mixtures of the above-mentioned compounds containing at least two isocyanate-reactive hydrogen atoms and having a molecular weight of from 400 to 10,000, for example mixtures of polyethers and polyesters.

In some cases, it is particularly advantageous to combine low-melting and high-melting polyhydroxyl compounds with one another (German Offenlegungsschrift No. 2,706,297).

Suitable optional starting components (d) are compounds containing at least two isocyanate-reactive hydrogen atoms and having a molecular weight of from 32 to 400. The compounds in question are compounds containing hydroxyl groups and/or amino groups and/or thiol groups and/or carboxyl groups, preferably compounds containing hydroxyl groups and/or amino groups which serve as additional chain-extenders or cross-linkers. These compounds generally contain from 2 to 8, preferably from 2 to 4 isocyanate-reactive hydrogen atoms, more particularly 2 isocyanate-reactive hydrogen atoms.

It is possible to use mixtures of different compounds containing at least two isocyanate-reactive hydrogen atoms and having a molecular weight in the range of from 32 to 400.

Examples of compounds such as these are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bishydroxymethyl cyclohexane, 2-methyl-1,3-propane diol, and dibromobutene diol (U.S. Pat. No. 3,723,322). Glycerol, trimethylol propane, 1,2,6-hexane triol, trimethylol ethane, pentaerythritol, quinitol, mannitol, sorbitol, castor oil, diethylene glycol, triethylene glycol, tetraethylene glycol and higher polyethylene glycols having a molecular weight of up to 400 are further examples of suitable compounds. Dipropylene glycol, higher polypropylene glycols having a molecular weight of up to 400, dibutylene glycol, higher polybutylene glycols having a molecular weight of up to 400, 4,4'-dihydroxy diphenyl propane, dihydroxy methyl hydroquinone, ethanolamine, diethanolamine, N-methyl diethanolamine, triethanolamine and 3-aminopropanol are additional examples of suitable compounds.

Other low molecular weight polyols suitable for the purpose of the instant invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084; 2,714,084; 2,714,104; 2,721,186; 2,738,154 and 2,738,512). In order to obtain plastics having improved flame resistance, these formoses are advantageously used in combination with aminoplast formers and/or phosphites (German Offenlegungsschriften Nos. 2,738,513 and 2,738,532). Solutions of polyisocyanate-polyaddition products, particularly solutions of polyurethane ureas containing ionic groups and/or solutions of polyhydrazoidicarbonamides in low molecular weight polyhydric alcohols may also be used as the polyol component in the instant invention (German Offenlegungsschrift No. 2,638,759).

Aliphatic diamines suitable for use in the instant invention are, for example, ethylene diamine, 1,4-tetramethylene diamine, 1,11-undecamethylene diamine, 1,12-dodecamethylene diamine and mixtures thereof. 1-amino-3,3,5-trimethyl-5-aminomethyl cyclohexane ("isophorone diamine"), 2,4- and 2,6-hexahydrotolylene diamine and mixtures thereof, perhydro-2, 4'- and 4,4'-diaminodiphenyl methane, p-xylylene diamine, bis-(3-aminopropyl)-methylamine, diaminoperhydro anthracenes (German Offenlegungsschrift No. 2,638,731) and cycloaliphatic triamines according to German Offenlegungsschrift No. 2,614,244. It is also possible in the instant invention to use hydrazine and substituted hydrazines, for example, methyl hydrazine, N,N'-dimethyl hydrazine and their homologs. Acid dihydrazides, for example, carbodihydrazide, oxalic acid dihydrazide, the dihydrazides of malonic acids, succinic acid, glutaric acid, adipic acid, β-methyl adipic acid, sebacic acid hydracrylic acid and terephthalic acid are also suitable. Semicarbazido alkylene hydrazides such as β-semicarbazido propionic acid hydrazide (German Offenlegungsschrift No. 1,770,591), semicarbazido alkylene carbazinic esters such as 2-semicarbazido ethyl carbazinic ester (German Offenlegungsschrift No. 1,918,504) or even amino-semicarbazide compounds such as β-aminoethyl semicarbazido carbonate (German Offenlegungsschrift No. 1,902,931) are also suitable compounds. To control their reactivity, the amino groups may be completely or partly blocked by aldimine or ketimine groups (U.S. Pat. No. 3,734,894; German Offenlegungsschrift No. 2,637,115).

Examples of aromatic diamines are bisanthranilic acid esters according to German Offenlegungsschriften Nos. 2,040,644 and 2,160,590, 3,5- and 2,4-diaminobenzoic acid esters according to German Offenlegungsschrift No. 2,025,900. The diamines containing ester groups described in German Offenlegungschriften No. 1,803,635 (U.S. Pat. Nos. 3,681,290 and 3,736,350); 2,040,650 and 2,160,589, the diamines containing ether groups according to German Offenlegungsschriften No. 1,770,525 and 1,809,172 (U.S. Pat. Nos. 3,654,364 and 3,736,295) are further examples of suitable diamines. Also suitable are 2-halogen-1,3-phenylene diamines optionally substituted in the 5-position (German Offenlegungsschriften Nos. 2,001,722; 2,025,896 and 2,065,869), 3,3'-dichloro-4,4'-diaminodiphenyl methane, tolylene diamine, 4,4'-diaminodiphenyl methane, and 4,4'-diaminodiphenyl disulphides (German Offenlegungsschrift No. 2,404,976). Diamino-diphenyl dithio ethers (German Offenlegungsschrift No. 2,509,404), aromatic diamines substituted by alkyl thio groups (German Offenlegungsschrift No. 2,638,760), diaminobenzene phosphonic acid esters (German Offenlegungsschrift No. 2,459,491), aromatic diamines containing sulphonate or carboxylate groups (German Offenlegungsschrift No. 2,720,166) and the high-melting diamines described in German Offenlegungsschrift No. 2,635,400 are still further examples of suitable compounds. Examples of aliphatic-aromatic diamines are the aminoalkyl thioanilines according to German Offenlegungsschrift No. 2,734,574.

Other suitable chain extenders are such compounds as 1-mercapto-3-amino-propane, optionally substituted amino acids, for example, glycine, alanine, valine, serine and lysine, and optionally substituted dicarboxylic acids, for example, succinic acid, adipic acid, phthalic acid, 4-hydroxy phthalic acid and 4-aminophthalic acid.

In addition, isocyanate-monofunctional compounds may be used as so-called chain terminators in proportions of from 0.01 to 10% by weight, based on polyurethane solids. Monofunctional compounds such as these are, for example, monoamines, such as butyl and dibutyl-amine, octylamine, stearylamine, N-methyl stearylamine, pyrrolidine, piperidine and cyclohexylamine, monoalcohols such as butanol, 2-ethyl hexanol, octanol, dodecanol, the various amyl alcohols, cyclohexanol, and ethylene glycol monoethyl ether.

It is preferred to work in the absence of additional chain-extending and cross-linking agents (component d).

Optional auxiliaries and additives (e) are for example, the known catalysts. Examples of these are tertiary amines, such as triethylamine, tributylamine, N-methyl morpholine, N-ethyl morpholine, N,N,N',N'-tetramethyl ethylene diamine, pentamethyl diethylene triamine and higher homologs (German Offenlegungsschriften Nos. 2,624,527 and 2,624,528). Also suitable compounds (e) are 1,4-diazabicyclo-(2,2,2)-octane, N-methyl-N'-dimethylaminoethyl piperazine, bis-(dimethyl-aminoalkyl) piperazines (German Offenlegungsschrift No. 2,636,787), N,N-dimethyl benzylamine N,N-dimethyl cyclohexylamine, N,N-dimethyl clclohexylamine, N,N-diethyl benzyl amine and bis-(N,N-diethyl-aminoethyl)-adipate. N,N,N',N'-tetramethyl-1,3-butane diamine, N,N-dimethyl-β-phenyl ethylamine, 1,2-dimethylimidazole, 2-methyl imidazole and the monocyclic and bicyclic amidines (German Offenlegungsschrift No. 1,720,633) are also suitable. Bis-(dialkylamino)-alkyl ethers (U.S. Pat. No. 3,330,782, German Auslegeschrift No. 1,030,558, German Offenlegungsschriften Nos. 1,804,361 and 2,618,280) and tertiary amines containing amide groups (preferably formamide groups) according to German Offenlegungsschriften Nos. 2,523,633 and 2,732,292 are still further examples of suitable compounds. Suitable catalysts are also the known Mannich bases of secondary amines, such as dimethylamine, and aldehydes, preferably formaldehyde, or ketones, such as acetone, methylethyl ketone or cyclohexanone, and phenols, such as phenol, nonyl phenol or bisphenol.

Tertiary amines containing isocyanate-reactive hydrogen atoms suitable for use as catalysts are, for example, triethanolamine, triisopropanolamine amine, N-methyl diethanolamine, N-ethyl diethanolamine and N,N-dimethyl ethanolamine. In addition their reaction products with alkylene oxides, such as propylene oxide and/or ethylene oxide and also secondary-tertiary amines according to German Offenlegungsschrift No. 2,732,292 are also suitable catalysts.

Other suitable catalysts are sila-amines containing carbon-silicon bonds, of the type described, for example, in German Patent No. 1,229,290 (corresponding to U.S. Pat. No. 3,620,984) for example, 2,2,4-trimethyl-2-silamorpholine and 1,3-diethylaminomethyl tetramethyl disiloxane.

Other suitable catalysts are nitrogen containing bases, such as tetraalkyl ammonium hydroxides. Also suitable are the alkali metal hydroxides such as sodium hydroxide, alkali metal phenolates, such as sodium phenolate, or alkali metal alcoholates, such as sodium methylate. Hexahydrotriazines may also be used as catalysts (German Offenlegungsschrift No. 1,769,043).

The reaction between NCO-groups and Zerewitinoff-active hydrogen atoms is also greatly accelerated by lactams and azalactams, an associate between the lactam and the compound containing acid hydrogen initially being formed. Associates such as these and their catalytic effect are described in German Offenlegungsschriften Nos. 2,062,288; 2,062,289; 2,117,576 (U.S. Pat. No. 3,758,444); 2,129,198; 2,330,175 and 2,330,211.

It is also possible to use organometallic compounds, particularly organotin compounds, as catalysts. In addition to sulphur-containing compounds such as di-n-octyl tin mercaptide (German Auslegeschrift No. 1,769,367; U.S. Pat. No. 3,654,927), preferred organotin compounds are tin (II) salts of carboxylic acids, such as tin (II) acetate, tin (II) octoate, tin (II) ethyl hexoate and tin (II) laurate, and tin (IV) compounds, for example dibutyl tin oxide, dibutyl tin dichloride, dibutyl tin diacetate, dibutyl tin dilaurate, dibutyl tin maleate or dioctyl tin diacetate.

Another group of suitable catalysts are organic and inorganic acids such as dibutyl phosphate, adipic acid, oleic acid and stearic acid.

All the above-mentioned catalysts may of course, be used in the form of mixtures. In this respect, combinations of organometallic compounds and amidines, aminopyridines or hydrazo pyridines (German Offenlegungsschriften Nos. 2,434,185; 2,601,082 and 2,603,834) are of particular interest.

Further representatives of catalysts suitable for use in the instant invention and information on the way in which they work can be found in Kunststoff-Handbuch by Vieweg and Hochtlen, Vol. VII, Carl-Hanser-Verlag, Munich, 1966, for example on pages 96 to 102.

The catalysts are generally used in a quantity of from about 0.001 to 10% by weight, based on the total quantity of compounds containing at least two isocyanate reactive hydrogen atoms.

Pigments or dyes and flameproofing agents, which are known, for example tris-chloroethyl phosphate, tricresyl phosphate or ammonium phosphate and polyphosphate, also stabilizers against the effects of ageing and weather, plasticizers and fungistatic and bacteriostatic substances as well as fillers such as barium sulphate, kieselguhr, carbon black or whiting, inorganic and organic fibers (glass fibers) and, additives which improve the separating properties of the elastomer (internal release agents) may also be used in the instant invention.

Further examples of additives which may optionally be used in the instant invention and information on the way in which these additives are used and on their respective modes of action can be found in Kunststoff-Handbuch by Vieweg and Hochtlen Vol. VII, Carl- Hanser-Verlag, Munich, 1966, for example on pages 103 to 113.

The instant process is carried out as follows:

The reaction components are reacted by the known one-shot process, by the prepolymer process or by the semi-prepolymer process, in many cases using machines, for example, of the type described in U.S. Pat. No. 2,764,565. Particulars of processing machines which may be used in the instant invention may be found in Kunststoff-Handbuch by Vieweg and Hochtlen, Vol. VII, Carl-Hanser-Verlag, Munich, 1966, for example, on pages 121 to 205.

In the case of the one-shot process, it is best to apply the known reaction injection molding technique. Where the prepolymer process is used, a prepolymer having an NCO-content of from about 2.5 to 15% by weight, preferably from 3.6 to 6.5% by weight and more particularly from about 4.5 to 5% by weight is preferably first prepared from components a, b and, optionally d and subsequently reacted with the chain-extending agent in an NCO/NH$_2$- equivalent ratio of from 0.9:1 to 1.2:1, preferably from 1:1 to 1.1:1.

The process of the instant invention is illustrated by, but in no way limited to, the following Examples in which the quantities quoted represent parts by weight and percentages by weight, unless otherwise indicated.

The following chain-extending agents were used in the Examples:

EXAMPLE 1

3,5,3',5'-tetraethyl-4,4'-diaminodiphenyl methane.

EXAMPLE 2

3,5,3',5'-tetraisopropyl-4,4'-diaminodiphenyl methane.

EXAMPLES 3, 12, 13, 14, 16, 17, 18

Formaldehyde mixed condensate with 2,6-diethylaniline and 2,6-diisopropyl aniline. Molar ratio of the anilines: 1:1.

EXAMPLE 4

Formaldehyde mixed condensate with 2,6-diethyl aniline and 2,6-diisopropyl aniline. Molar ratio of the anilines: 1:3.

EXAMPLE 5

Formaldehyde mixed condensate with 2,6-diethylaniline and aniline. Molar ratio of the anilines: 1:1.

EXAMPLE 6

Formaldehyde mixed condensate with 2,6-diisopropyl aniline and aniline. Molar ratio of the anilines: 1:1.

EXAMPLES 7, 15

3,3'-dichloro-4,4'-diaminodiphenyl methane (MOCA).

EXAMPLE 8

3,3'-dicarbethoxy-4,4'-diaminodiphenyl methane.

EXAMPLE 9

Formaldehyde mixed condensate with 2,6-diethyl aniline and 2-ethyl aniline. Molar ratio of the anilines: 3:2.

EXAMPLE 10

Like example 9. Molar ratio of the anilines: 1:1

EXAMPLE 11

Like example 9. Molar ratio of the anilines 2:3

Examples 3, 4, 9 to 14 and 16 through 18 illustrate the present invention. Examples 1,2, 5 to 8 and 15 are comparison examples.

The formaldehyde mixed condensates used in examples 3 to 6, 9 to 14, and 16 to 18 were produced by the following general procedure:

A mixture of 3.5 mols each of anilines A and B is initially introduced and heated to 50° C. 0.7 mol of 30% hydrochloric acid is added with stirring, the temperature rising to approximately 55° C. 3.41 kg of formalin (30%) are then added with continued stirring and external cooling with water at such a rate that the temperature can be kept at from 50° to 60° C. On completion of the addition, the mixture is heated to boiling point and kept under reflux (100° C.) for 4 hours. The heat is then switched off and the reaction mixture neutralized using 1.1 mols of sodium hydroxide (50%). After 15 minutes, the stirrer is switched off and the lower aqueous phase is removed and discarded. The upper organic phase is heated with stirring to 150° C., most of the dissolved water distilling off. Towards the end, vacuum is applied to remove the residual water. The crude product is a dark brown oil. It is purified by distillation.

Table I: The polyurethane urea elastomers of Examples 1 through 11 were produced by the following procedure:

1 mol of a linear polypropylene glycol (molar weight 1500) was reacted with 2 mols of 2,4-tolylene diisocyanate for 4 hours at from 70° to 80° C. to form a prepolymer containing terminal NCO-groups. The NCO-prepolymer preheated to 70° C. was mixed with the chain-extending agent kept at room temperature (in Examples 5 and 6) or at from 10° to 15° C. above the melting temperature, the reaction mixture introduced into a mold heated to 80° C. and, after demolding heated for 12 hours at 80° C. In the case of the low-melting or liquid chain-extending agents (Examples 3 to 6 and 9 to 11), the reaction mixture was processed by means of a high-pressure metering unit. In the case of the other Examples, the reaction mixture was processed by means of gear pumps (low-pressure metering) and subsequently mixed by means of a stirrer.

In every case, the NCO/NH$_2$ equivalent ratio between prepolymer and chain-extending agent amounted to 1:0.95.

Table II: Examples 12 and 13

1 Mol of a linear polypropylene glycol (molecular weight 1500) was reacted with 2 mols of a mixture of 65% 2,4-tolylene diisocyanate and 35% 2,6-tolylene diisocyanate (Ex. 12) or with 2 mols of hexamethylene diisocyanate (Ex. 13) to form prepolymers containing terminal NCO-groups. These NCO-prepolymers were further reacted as indicated in the general procedure for Table I.

Table III: Examples 14 and 15

Adiprene L 100 (a product of DuPont de Nemours Company) was used as NCO-prepolymer. In Example 14 this prepolymer was chain-extended as described in the general procedure for Table I. In case of the comparison example 15, chain extension was carried out following the recommendations of the leaflet No. 8/75-200-16/A, issued by DuPont.

Table IV: Examples 16, 17 and 18

1 Mol of a linear polycaprolactone (starter: 1,6-hexane diol, molecular weight=2000) was reacted with 2,3 mols of 2,4-tolylene diisocyanate (Ex. 17) or with 2,0 mols of hexamethylene diisocyanate (Ex. 18) to form prepolymers containing terminal NCO-groups. These prepolymers were chain extended according to the general procedure given for the Examples of Table I.

TABLE I

| Example | 1 | 2 | 3 | 4 | 5 | 6 | 7 | 8 | 9 | 10 | 11 |
|---|---|---|---|---|---|---|---|---|---|---|---|
| Melting Point of the chain-extender [°C.] | 89 | 64 | 25 | 30 | liquid | liquid | 100 | 109 | 51 | 35 | <27 |
| Pouring time [secs.] | 10 | 20 | 45 | 50 | 15 | 40 | 120 | 120 | 20 | 20 | 20 |
| In mold time [mins.] | 4 | 5 | 10 | 10 | 5 | 30 | 15 | 20 | 5½ | 5 | 3½ |
| Tensile Test (DIN 53 504) | | | | | | | | | | | |
| 100% [MPa] | 6.33 | 4.83 | 6.94 | 5.24 | 4.84 | 2.68 | 3.64 | 6.00 | 7,0 | 6,7 | 6,3 |
| 300% [MPa] | 10.6 | 6.26 | 8.00 | 6.81 | 6.15 | 4.60 | 5.63 | 9.04 | 9,9 | 9,6 | 8,9 |
| Tensile Strength [MPa] | 32.1 | 24.0 | 26.2 | 27.3 | 21.4 | 16.3 | 11.6 | 16.1 | 21,7 | 22,0 | 25,0 |
| Breaking elongation [%] | 521 | 593 | 635 | 601 | 581 | 606 | 629 | 565 | 460 | 460 | 480 |
| Tear propagation resistance (DIN 53 515) [kN/m] | 41.7 | 34.5 | 53.9 | 35.6 | 35.8 | 30.6 | 29.4 | 34.1 | 35,0 | 38,5 | 32,0 |
| Shore A hardness (DIN 53 505) | 90 | 85 | 89 | 84 | 82 | 71 | 83 | 91 | 89 | 89 | 88 |
| Elasticity (DIN 53 512) [%] | 45 | 40 | 43 | 40 | 38 | 29 | 40 | 37 | 42 | 43 | 44 |
| Damping maximum (DIN 53 445) [°C.] | −30 | −28 | −30 | −28 | −23 | −5 | −25 | −20 | −30 | −30 | −30 |

TABLE II

| Example | 12 | 13 |
|---|---|---|
| Melting Point of the chain extender [°C.] | 25 | 25 |
| Pouring Time [secs.] | 30 | 65 |
| In-mold time [mins.] | 5½ | 8 |
| Tensile Test (DIN 53 504) | | |
| 100% [MPa] | 8,4 | 6,0 |
| 300% [MPa] | 10,2 | 7,6 |
| Tensile Strength [MPa] | 30,0 | 19,5 |
| Breaking elongation [%] | 580 | 635 |
| Tear propagation resistance (DIN 53 515) [kN/m] | 49,0 | 33 |
| Shore A hardness (DIN 53 505) | 91 | 89 |
| Elasticity (DIN 53 512) [%] | 45 | 55 |
| Damping maximum (DIN 53 445) [°C.] | −30 | −42 |

TABLE III

| Example | 14 | 15 |
|---|---|---|
| Melting Point of the chain extender [°C.] | 25 | 100 |
| Pouring Time [secs.] | 15 | 360 |
| In-mold time [mins.] | 6½ | 15 |
| Tensile Test (DIN 53 504) | | |
| 100% [MPa] | 9,6 | 7,1 |
| 300% [MPa] | 17,4 | 12,8 |
| Tensile Strength [MPa] | 46,9 | 34,0 |
| Breaking elongation [%] | 440 | 440 |
| Tear propagation resistance (DIN 53 515) [kN/m] | 36,3 | 26,5 |
| shore A hardness (DIN 53 505) | 94 | 88 |
| Elasticity (DIN 53 512) [%] | 45 | 44 |
| Damping maximum (DIN 53 445) [°C.] | −35 | −20 |

TABLE IV

| Example | 16 | 17 | 18 |
|---|---|---|---|
| Melting Point of the chain extender [°C.] | 25 | 25 | 25 |
| Pouring Time [secs.] | 20 | 10 | 30 |
| In-mold time [mins.] | 6 | 5 | 15 |
| Tensile Test (DIN 53 504) | | | |
| 100% [MPa] | 7,7 | 8,0 | 5,1 |
| 300% [MPa] | 14,0 | 17,6 | 10,0 |
| Tensile Strength [MPa] | 49,8 | 48,3 | 43,0 |

TABLE IV-continued

| Example | 16 | 17 | 18 |
|---|---|---|---|
| Breaking elongation [%] | 414 | 422 | 520 |
| Tear propagation resistance (DIN 53 515) [kN/m] | 55,3 | 59,4 | 33 |
| Shore A hardness (DIN 53 505) | 91 | 93 | 85 |
| Elasticity (DIN 53 512) [%] | 43 | 46 | 60 |
| Damping maximum (DIN 53 445) [°C.] | −35 | −35 | below −35 |

It can be seen that the chain-extender mixtures used in the instant invention (Examples 3 4, 9 to 14 and 16 through 18) advantageously show a low melting point, lead to a relatively long pouring time and short inmold time of the reaction mixture and give polyurethane elastomers having outstanding properties.

What is claimed is:

1. A process for the production of non-cellular polyurethane urea elastomers comprising reacting:
   (a) polyisocyanates,
   (b) compounds containing at least two isocyanate-reactive hydrogen atoms and having a molecular weight in the range of from 400 to 15,000, and
   (c) alkyl-substituted diaminodiphenyl methanes, characterized in that component (c) is prepared by condensing formaldehyde with alkyl-substituted anilines corresponding to the formulae:

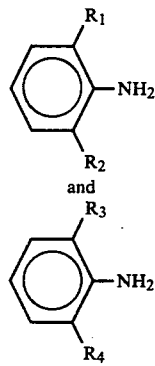

with a molar ratio of A to B of from 1:4 to 4:1, wherein $R_1$, and $R_3$ which may be the same or different, represent hydrogen or an alkyl group containing 1 to 4 carbon atoms, and $R_2$ and $R_4$ which may be the same or different represent an alkyl radical containing from 1 to 4 carbon atoms and wherein A and B are not the same.

2. A process as claimed in claim 1, wherein component (c) is a formaldehyde condensation product of the alkyl-substituted anilines A and B with a molar ratio of A to B from 1:3 to 3:1.

3. A process as claimed in claim 1 or 2, wherein component (c) is a formaldehyde condensation product of equimolar quantities of the alkyl-substituted anilines A and B.

4. A process as claimed in claim 1, wherein component (c) contains at least 25 mol percent of an asymmetrically substituted 4,4′diaminodiphenyl methane corresponding to the formula:

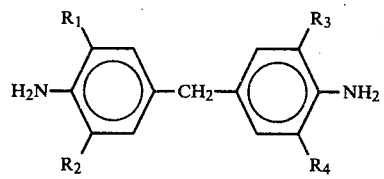

wherein $R_1$, $R_2$, $R_3$, and $R_4$ are defined as in claim 1.

5. A process as claimed in claim 4, wherein component (c) contains from 40 to 65 mol percent of the compound corresponding to the formula:

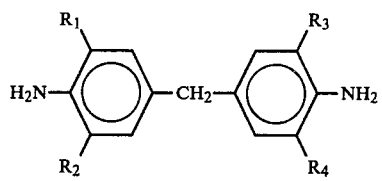

6. A process as claimed in claim 1, wherein a formaldehyde condensation product of 2-ethylaniline and 2-isopropyl aniline is used as component (c).

7. A process as claimed in claim 1, wherein a formaldehyde condensation product of 2-ethyl aniline and 2,6-diethyl aniline is used as component (c).

8. A process as claimed in claim 1, wherein a formaldehyde condensation product of 2-ethyl aniline and 2,6-diisopropyl aniline is used as component (c).

9. A process as claimed by claim 1, wherein a formaldehyde condensation product of 2,6-diethylaniline and 2,6-diisopropyl aniline is used as component (c).

10. The process of claim 1, wherein up to 100 mol percent, based on (c) of compounds containing at least two isocyanate-reactive hydrogen atoms and having a molecular weight of from 32 to 400 are also present.

11. The process of claim 1, wherein the reaction is conducted in the presence of catalyst and other additives.

12. The process of claim 1, wherein $R_1$, $R_2$, $R_3$, and/or $R_4$ represent a branched alkyl group.

* * * * *